United States Patent [19]

Chikashige

[11] 4,003,065

[45] Jan. 11, 1977

[54] FLASH DEVICE FOR A FOCAL PLANE SHUTTER CAMERA

[76] Inventor: Kiyoshi Chikashige, c/o Asahi Kogaku-ryo, No. 33, 1-chome, Itabashi, Tokyo, Japan

[22] Filed: Oct. 17, 1975

[21] Appl. No.: 623,228

Related U.S. Application Data

[63] Continuation of Ser. No. 469,439, May 13, 1974, abandoned.

[30] Foreign Application Priority Data

May 30, 1973 Japan .................. 48-64339
Nov. 19, 1973 Japan .................. 48-133594

[52] U.S. Cl. ............... 354/132; 240/1.3; 354/137; 355/71
[51] Int. Cl.² .................................. G03B 15/03
[58] Field of Search ......... 354/132, 137, 138, 148; 240/1.3, 37, 37.1, 20; 355/69, 70, 71

[56] References Cited

UNITED STATES PATENTS 2,427,969  9/1947  Lester .................. 354/132

*Primary Examiner*—Russell E. Adams, Jr.
*Attorney, Agent, or Firm*—Knobbe, Martens, Olson, Hubbard & Bear

[57] ABSTRACT

A flash device having a plurality of flashbulbs which operate sequentially by the use of time delay circuits to produce a longer duration of flashlight. Light reducing filters are used adjacent the flashbulbs to reduce the light intensity of the flashbulbs to obtain a more uniform light intensity during the length of the flash of all the flashbulbs, especially in the areas of overlapping of light intensity between adjacent sequential flashbulbs. A second embodiment modifies the light intensity by the placement of the flashbulbs in relation to the optical axis of the reflecting mirror.

11 Claims, 9 Drawing Figures

ID. 4,003,065

FLASH DEVICE FOR A FOCAL PLANE SHUTTER CAMERA

This is a continuation of Ser. No. 469,439, filed May, 13, 1976, now abandoned.

BACKGROUND Conventional class FP flashbulbs available in the market are designed for use with a 35mm camera, and when used with a camera having a larger frame size, they often bring about unevenly exposed pictures. Especially, when a large frame-sized camera having a comparatively long screen running time is used, the danger of uneven exposure will increase unless a flashlight having a longer duration is used.

To eliminate this danger of uneven exposure, a large flashbulb must be used. Such a large flashbulb, however, is not very convenient, because it requires a large-sized flash device and such a special large-sized flash device is not easily available in the market.

For the purpose of solving this problem an elongated flashlight duration may be obtained by flashing a plurality of flashbulbs one by one at the intervals. By this method, however, a flashlight having a long duration and a flat characteristic cannot be obtained only by flashing a plurality of flashbulbs one by one at time intervals, because each flashbulb has such a flashlight characteristic that it rapidly reaches the peak level in the early period of flashing and reduces its brightness gradually in the end of flashing.

FIG. 1 represents a flashlight characteristic curve a of a single small flashbulb in comparison to an ideal flashlight characteristic curve b required by a large-sized camera.

FIG. 2 is a graph for explaining what type of composite flashlight characteristic can be obtained by flashing two separate small flashbulbs having equal flashlight characteristic curves as shown at a and a'. As is mentioned previously, each flashbulb has a large light increasing rate in the early period of flashing and small light reducing rate in the end of flashing. Therefore, the composite flashlight obtained by composing these flashlight: will not have a flat characteristic but include a peak c at each overlapping position. Such a peak of flashlight will cause an unevenness of exposure.

SUMMARY

This invention has means for sequentially flashing a plurality of flash parts such as flashbulbs one by one at time intervals, and means for reducing individually the intensity of flashlights from said flashbulbs to obtain an improved flashlight characteristic from small flashbulbs. The flashlight obtained by the flash device has a long duration and flat or uniform characteristic, as shown in FIGS. 5 and 9.

A series of time delay circuits are used to control the activation of each of the flash parts to produce the longer duration. The intensity of each flash part is controlled by the use of scattering plates in front of each flash part to provide a more uniform light intensity toward the subject being photographed. Consequently, the problem of uneven exposure is alleviated when using a large frame-sized camera.

DETAILED DESCRIPTION OF THE INVENTION

Figure 3:
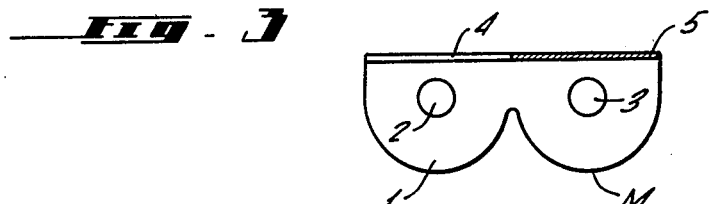
FIG. 3 is a partial sectional plan view schematically showing the main portion of the flash device according to one embodiment of this invention.

Now the invention will be described with reference to preferred embodiments. FIG. 3 is a partialy mechanical plan view of the flash portion of the flash device according to one embodiment of this invention. Indicated at 1 is a main body or housing of the flash device, including a reflecting mirror M. first flashbulb 2 and a second flashbulb 3 which is controlled to start flashing after a delay from the start of the first flashbulb 2 for a predetermined time. In front of the flashlight window for the first flashbulb 2 is arranged a transparent scattering plate 4 while in front of the flashlight window for the second bulb 3 is arranged another scattering plate 5, acting as a light reducing filter. The scattering plate 5 may be an ordinary neutral filter or a light reducing grating.

Figure 4:
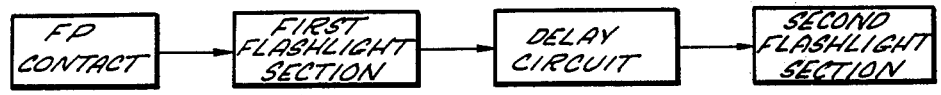
FIG. 4 is a block diagram of the electrical circuit arrangement for use in the flash device of FIG. 3.

Illustrated in FIG. 4 is a block diagram of the electric circuit for use in the above-described flash device for controlling the flash starting time. In this circuit the first flashbulb circuit is responsive as a flash starting signal from the FP contact of the camera to flash the first flashbulb 2 and, at the same time, applies a starting signal to a delay circuit. A predetermined time after receiving the starting signal, the delay circuit applies a flash starting signal to a second flashbulb circuit to flash the second flashbulb 3.

Figure 1:
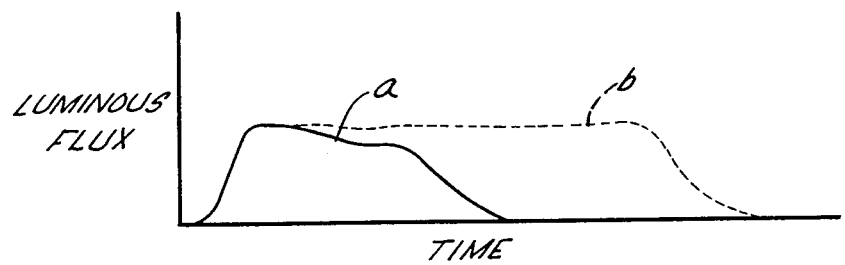
FIG. 1 is a graph representing a flashlight characteristic curve of a single small flashbulb in comparison with an ideal flashlight characteristic curve requred for a large frame size camera.
Figure 2:
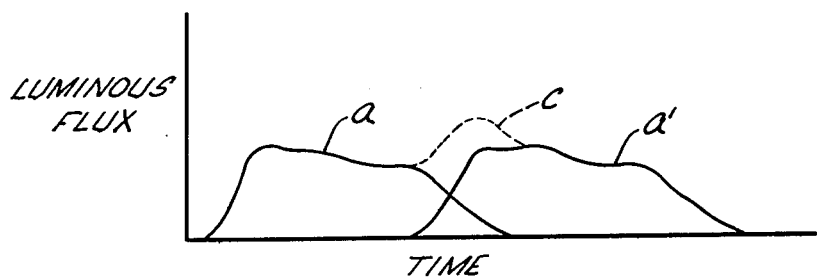
FIG. 2 is a graph representing flashlight characteristic curves of two separate small-sized flashbulbs, including a curve obtained by composing these characteristic curves.
Figure 5:
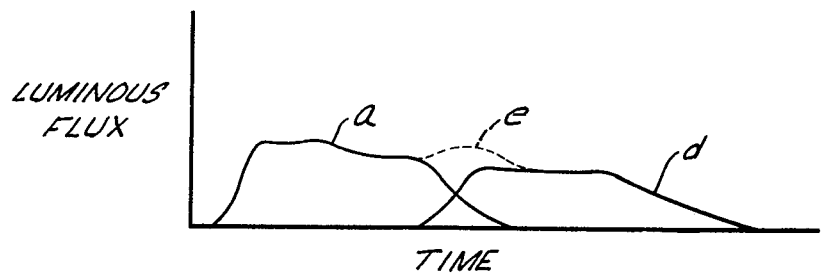
FIG. 5 is a graph representing the composite flashlight characteristic curve obtained by the flash device of FIG. 3.

FIG. 5 represents a characteristic curve of the composite flashlights obtained by the flash device of FIGS. 3 and 4. According to this embodiment the flashlight emitted from the first flashbulb 2 and passed through the transparent spattering plate 4 has a characteristic curve as shown by a. The flashlight emitted from the second flashlight 3 delayed from the first flashbulb 2 for a predetermined time and passed through the light reducing scattering plate 5 has a characteristic curve as shown by d. Thus, the resulting composite flashlight has a characteristic as shown by curve e. Over its entire duration the composite flashlight includes no remarkable uneveness, but has a nearly flat characteristic similar to the ideal characteristic b shown in FIG. 1.

Figure 6:
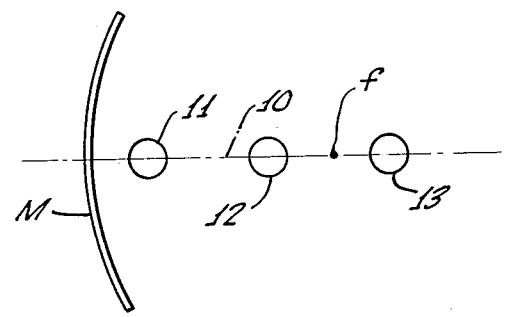
FIG. 6 is a schematic view of the main portion of the flash device according to another embodiment of this invention.
Figure 7:
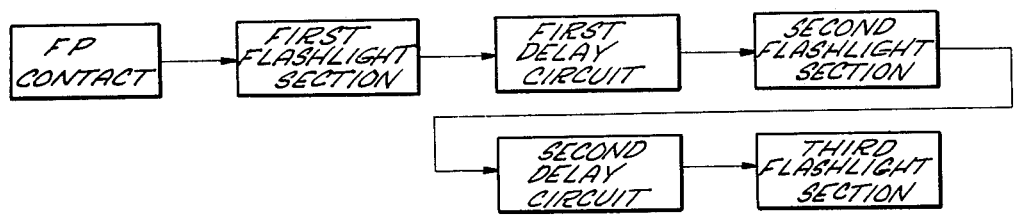
FIG. 7 is a block diagram of the electrical circuit arrangement for use in the flash device of FIG. 6.

Illustrated in FIGS. 6 and 7 is another embodiment of this invention, showing a reflecting mirror M with a focal point F. In the optical axis 10 of the reflecting mirror M are arranged flashbulbs 11, 12 and 13. The flashbulb 11 located at a position between the center of the reflecting mirror M and its focal point f. The flashbulb 12 is located close to the focal point f while the flashbulb 13 is positioned outside of the focal point f.

FIG. 7 is a block diagram of an electric circuit for use in the flash device shown in FIGS. 6 and 7 for controlling the flash starting time. Upon receiving a flash starting signal from the FP contact of the camera, the first flashbulb circuit fires the flashbulb 12 and simultaneously applies a starting signal to the first delay circuit. A predetermined tire after receiving the starting signal, the first delay circuit applies a flash starting signal to the second flashbulb circuit to fire the flashbulb 11. Similarly, a predetermined time after flashing the flashbulb 11 the third flashbulb circuit fires the flashbulb 13.

Figure 8:
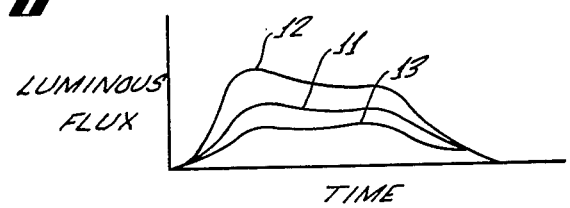
FIG. 8 is a graph representing flashlight characteristic curves obtained by three separate flashbulbs included in the flash device of FIG. 6.
Figure 9:
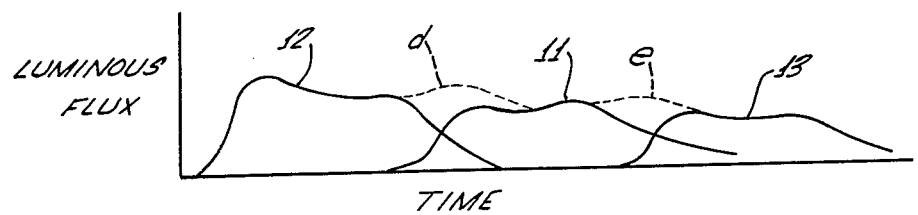
FIG. 9 is a graph representing the composite flashlight characteristic curve obtained by the flash device of FIG. 6.

In this embodiment the flashbulbs 11, 12 and 13 have flashlight characteristics as shown in FIG. 8 by curves 11, 12 and 13, respectively. It will be noted from these curves that the flashbulbs 12, 11 and 13 have increasingly smaller flashlight intensities in this order. Therefore, if the flashbulbs are fired one by one in this order at time intervals, the resulting composite flashlight will have a characteristic curve as shown in FIG. 9. This curve has a satisfactory flatness even at the overlapping positions as shown by dotted lines d and e.

What is claimed is:

1. A flash device for use with a focal plane shutter camera, said flash device comprising:
   a plurality of light sources of equal intensity, each source having a large light increasing rate in the early period of flashing and a lower light reducing rate in the end of flashing;
   means for sequentially activating said plurality of light sources in a manner such that the end of the flashing period for a first light source overlaps with the beginning of a succeeding source with the timing such that an intensity peak of undesirable height would occur at the overlapped portion if the light output of the sources were not modified, each of said light sources being fixed with respect to said camera throughout its flashing period; and
   means for sequentially and individually reducing the intensity of said succeeding light source throughout its flashing period to reduce said intensity peak of said overlapped portion.

2. A flash device as defined in claim 1 wherein said means for reducing the intensity of said light sources comprises a filter plate for said second source located between said second source and the subject viewed by the camera.

3. A flash device as defined in claim 1 wherein said reducing means includes a reflecting mirror mounted adjacent said plurality of light sources to direct said activated light sources toward the subject viewed by said camera, said sources being positioned with respect to said mirror so that each of the succeeding light sources provide an output toward the subject which is less than the light output toward the subject than the preceding source provides.

4. A flash device as defined in claim 1 wherein said means for individually reducing the intensity of said light sources comprises a reflecting mirror mounted adjacent said light sources and having a focal point, said plurality of light sources located along an optical axis of said mirror, at least two of said light sources located between said mirror and said focal point, at least one of said light sources located adjacent said focal point on the side opposite from said mirror.

5. A flash device as defined in claim 1 wherein said means for sequentially activating said plurality of light sources comprises:
   a first light source circuit;
   a plurality of light source circuits connected in series to said first light source circuit; and
   a plurality of time delay circuits connected in series alternately with said plurality of light source circuits, each of said plurality of light source circuits responsive respectively to one of said plurality of time delay circuits, resulting in said plurality of light sources producing a longer duration of light intensity than one of said plurality of light sources.

6. A method for providing a light source of a long duration for use with a focal plane shutter camera comprising the steps of:
   providing a plurality of light sources of equal intensity to illuminate the subject to be photographed by said camera;
   activating said plurality of light sources sequentially in a manner such that the end of the flashing period for a first light source overlaps with the beginning of a succeeding source with the timing being such that an intensity peak of undesirable height would occur at the overlapped portion if the light output of the sources were not modified, each of said light sources being fixed with respect to the camera throughout its flashing period; and
   reducing individually and sequentially the light intensity of each succeeding source of said plurality of light wources throughout its flashing period.

7. A flash device for use with a camera to produce a luminous output during the exposure of a single picture having
   an intensity which varies with time in a predetermined manner comprising:
   a plurality of light sources of equal intensity;
   means for sequentially activating said sources during the exposure of a single picture while said light sources remain fixed with respect to said camera; and
   means for individually modifying the light output of selected ones of said light sources.

8. The flash device of claim 7 wherein each of said light sources has a large light increasing rate in the early period of flashing and a lower light reducing rate in the end of flashing.

9. The device of claim 7 wherein said modifying means is a filter.

10. The device of claim 7 wherein said modifying means comprises a reflecting mirror mounted adjacent said light sources to direct light toward the subject viewed by the camera, at least one of said sources being positioned at a location other than the focal point of the reflecting mirror throughout its flashing period so that light output of said one source is reduced.

11. A method for providing a luminous output during the exposure of a single picture having an intensity which varies with time in a predetermined manner comprising:
   providing a plurality of light sources of equal intensity; and
   sequentially activating said sources during the exposure of said single picture, while each of said sources is fixed during its flashing period; and
   modifying the light output of selected ones of said light sources in a predetermined manner.

* * * * *